(12) United States Patent
Fok et al.

(10) Patent No.: US 10,989,865 B2
(45) Date of Patent: Apr. 27, 2021

(54) STRETCHABLE FIBER OPTIC SENSOR

(71) Applicant: University of Georgia Research Foundation, Inc., Athens, GA (US)

(72) Inventors: Mable P. Fok, Bishop, GA (US); Xiangiao Wang, Bogart, GA (US); Li Xu, Sunnyvale, CA (US)

(73) Assignee: UNIVERSITY OF GEORGIA RESEARCH FOUNDATION, INC, Athens, GA (US)

(*) Notice: Subject to any disclaimer, the term of this patent is extended or adjusted under 35 U.S.C. 154(b) by 0 days.

(21) Appl. No.: 16/266,659

(22) Filed: Feb. 4, 2019

(65) Prior Publication Data

US 2019/0243062 A1    Aug. 8, 2019

Related U.S. Application Data

(60) Provisional application No. 62/626,406, filed on Feb. 5, 2018, provisional application No. 62/639,142, filed on Mar. 6, 2018.

(51) Int. Cl.
*G02B 6/02* (2006.01)

(52) U.S. Cl.
CPC .................. *G02B 6/02076* (2013.01)

(58) Field of Classification Search
CPC .............. G02B 6/02076; G02B 6/022; G02B 2006/0209; G02B 2006/12107; G02B 2006/12138; G01D 5/35316; G01L 1/242; G01L 1/243; G01L 1/245; G01L 1/246
USPC ............................................. 385/12, 13, 37
See application file for complete search history.

(56) References Cited

U.S. PATENT DOCUMENTS

| 7,200,292 | B2* | 4/2007 | Shang | G01C 9/06 |
| | | | | 385/12 |
| 10,132,700 | B2* | 11/2018 | Maul | G01B 11/18 |
| 2002/0092976 | A1* | 7/2002 | Sugai | G01L 1/246 |
| | | | | 250/227.14 |
| 2003/0053197 | A1* | 3/2003 | Shigematsu | G02B 6/124 |
| | | | | 359/337.21 |
| 2005/0002610 | A1* | 1/2005 | Bylander | G02B 6/022 |
| | | | | 385/37 |
| 2007/0201793 | A1* | 8/2007 | Askins | G01B 11/18 |
| | | | | 385/37 |
| 2010/0008627 | A1* | 1/2010 | Kopp | G02B 6/02071 |
| | | | | 385/37 |
| 2010/0158438 | A1* | 6/2010 | Churikov | G02B 6/021 |
| | | | | 385/28 |
| 2011/0247234 | A1* | 10/2011 | Friess | F26B 5/06 |
| | | | | 34/427 |

(Continued)

OTHER PUBLICATIONS

"Optical fiber sensors embedded into medical textiles for healthcare monitoring" by Grillet et al, IEEE Sensors Journal, vol. 8, No. 7, pp. 1215-1222, 2008.*

(Continued)

*Primary Examiner* — Robert Tavlykaev
(74) *Attorney, Agent, or Firm* — Thomas | Horstemeyer, LLP

(57) ABSTRACT

The present disclosure relates to a stretchable fiber optic sensor that can measure tension, bending, and torsion direction of an object. The fiber optic sensor includes an optical fiber with a fiber Bragg grating (FBG) embedded in a sinusoidal configuration at an off-center position of a deformable substrate.

20 Claims, 15 Drawing Sheets

(56) References Cited

U.S. PATENT DOCUMENTS

| | | | | |
|---|---|---|---|---|
| 2012/0070112 A1* | 3/2012 | Mitachi | ............ | G01D 5/35345 385/13 |
| 2012/0274923 A1* | 11/2012 | Kreuzer | ............ | G01B 1/00 356/32 |
| 2013/0345035 A1* | 12/2013 | Berendes | ............ | D21F 3/06 492/48 |
| 2015/0160082 A1* | 6/2015 | Khoraych | ............ | G01L 3/12 73/862.324 |
| 2017/0371069 A1* | 12/2017 | Malling | ............ | G01K 15/005 |
| 2020/0041313 A1* | 2/2020 | Ohmori | ............ | G01D 5/3538 |

OTHER PUBLICATIONS

"Sensing characteristics of plastic optical fibers measured by optical time-domain reflectometry" by Husdi et al, Measurement Science and Technology, vol. 15, pp. 1553-1559, 2004.*

M. Amjadi, K. U. Kyung, I. Park, and M. Sitti, "Stretchable, Skin-Mountable, and Wearable Strain Sensors and Their Potential Applications: A Review," Adv. Fund. Mater. 26(11), pp. 1678-1698 (2016).

S. Seo, S. Kim, J. Jung, R. Ma, S. Baik, and H. Moon, "Flexible Touch Sensors Made of Two Layers of Printed Conductive Flexible Adhesives." Sensors 16(9), p. 1515 (2016).

C. To, T.L. Hellebrekers, and Y.L. Park, "Highly stretchable optical sensors for pressure, strain, and curvature measurement." in Intelligent Robots and Systems (IROS), 2015 IEEE/RSJ International Conference pp. 5898-5903 (2015).

J. Guo, M. Niu, and C. Yang, "Highly flexible and stretchable optical strain sensing for human motion detection," Optica, 4(10), pp. 1285-1288 (2017).

A. D. Kersey, M. A. Davis, H. J. Patrick, M. LeBlanc, K. P. Koo, C. G. Askins, M. A. Putnam, and E. J. Friebele. "Fiber grating sensors," J. Lightwave Technol. 15(8), pp. 1442-1463 (1997).

J. Ge, A. E. James, L. Xu, Y. Chen, K. W. Kwok, and M. P. Fok, "Bidirectional Soft Silicone Curvature Sensor Based on Off-Centered Embedded Fiber Bragg Grating," IEEE Photon. Technol. Lett. 28(20), pp. 2237-2240 (2016).

L. Xu, J. Ge, J. H. Patel, and M. P. Fok, "Dual-layer orthogonal fiber Bragg grating mesh based soft sensor for 3-dimensional shape sensing." Opt. Express 25(20), pp. 24727-24734 (2017).

Ge, Jia, et al., "Spiral-structured fiber Bragg grating for contact force sensing through direct power measurement", May 2014 | vol. 22, No. 9 | DOI:10.1364/OE.22.010439 | Optics Express 10.

\* cited by examiner

Compression

Tension

STRETCHABLE FIBER OPTIC SENSOR

CROSS REFERENCE TO RELATED APPLICATIONS

This application claims the benefit of, and priority to, U.S. Provisional Patent Application No. 62/626,406 entitled "Stretchable Fiber Optic Sensor" filed on Feb. 5, 2018, and of U.S. Provisional Patent Application No. 62/639,142 entitled "Stretchable Fiber Optic Sensor" filed on Mar. 6, 2018, both of which are incorporated herein by reference in their entireties.

STATEMENT REGARDING FEDERALLY SPONSORED RESEARCH OR DEVELOPMENT

This invention was made with government support under grant number CMMI 1400100 awarded by the National Science Foundation (NSF). The Government has certain rights in the invention.

BACKGROUND

Stretchable, skin-mountable, and wearable devices with monitoring capabilities have attracted tremendous attentions in recent years, due to the wide range of applications in health indicator monitoring, body movement detection, and soft robotics. All these applications require the sensors to be flexible and stretchable such that it can fit to the movement of the flexible object for sensing. Soft electronics and liquid metals are two commonly used techniques for designing stretchable sensors which are capable of measuring strain, force, pressure, and temperature. Most existing approaches are based on the change in resistivity, conductivity, capacitive, and inductivity of the sensor, which is not suitable for magnetic resonance imaging (MRI) or harsh environments.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2A is a photo of the fiber optic sensor without stretching. FIG. 2B is a photo of the fiber optic sensor being stretched, in accordance with various embodiments of the present disclosure.

DETAILED DESCRIPTION

Figure 1:
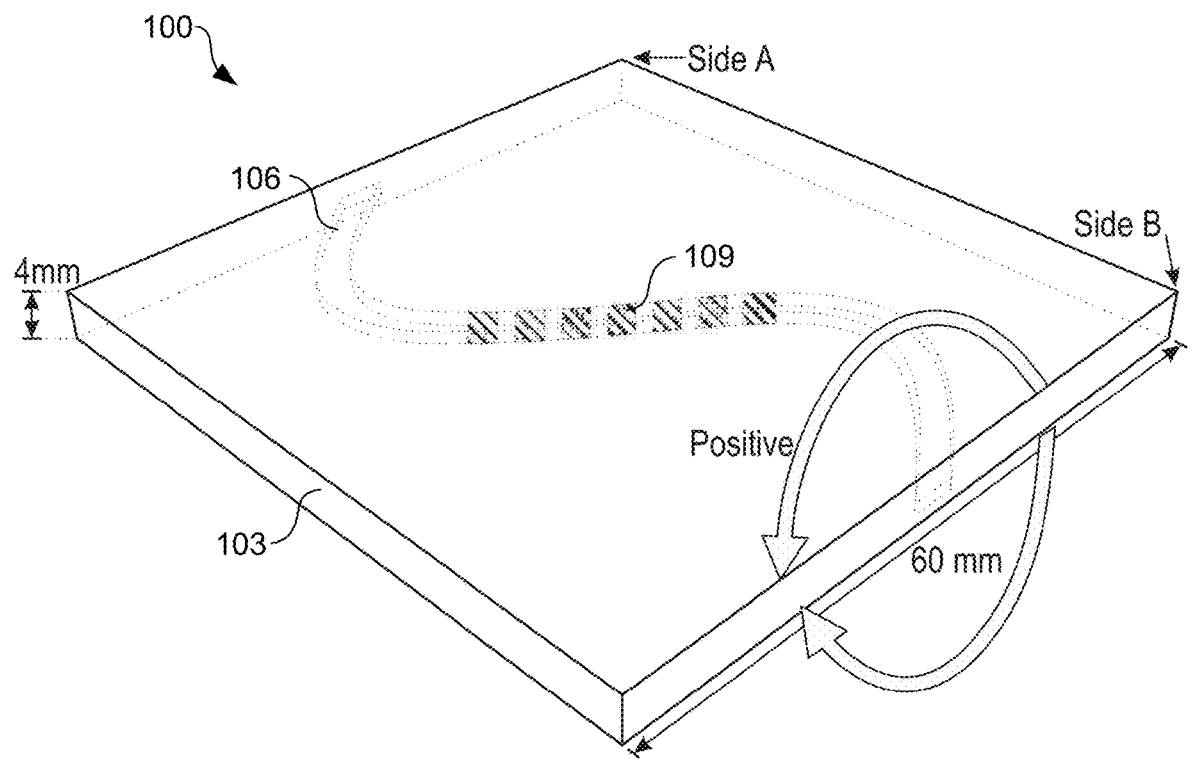
FIG. 1 is a graphical representation illustrating a perspective view of a fiber optic sensor, in accordance with various embodiments of the present disclosure.

Disclosed herein are various embodiments related to a stretchable fiber optic sensor that can measure tension, bending, and torsion direction of an object. The fiber optic sensor of the present disclosure comprises an optical fiber with a fiber Bragg grating (FBG) being embedded in deformable substrate. The optical fiber is embedded in a sinusoidal configuration at an off-center position of the deformable substrate. The unique sinusoidal configuration of the optical fiber enables torsion direction sensing as well as an about thirty percent elongation of the stretchable fiber optic sensor, which cannot be achieved in other conventional glass fiber based fiber optic sensors. Furthermore, the off-center embedded position facilitates the extraction of direction information in bending measurement. Measurement of tension, bending, and torsion direction are successfully achieved using the stretchable fiber optic sensor. The soft and stretchable sensor can be used in various applications, including, for example, biomedical and soft robotic applications.

Although fiber optic sensors have shown unique advantages over known electronic sensors, such as, for example, small size, low loss, flexibility, and immunity to electromagnetic interference, optical fiber is stiff and has a very limited deformability—making it not suitable as a stretchable sensor that fits to a flexible object with significant deformations. One known stretchable optical sensor is based on a stretchable polymer material Polydimethylsiloxane coated with a reflective gold layer. Pressure, strain, and bending can be detected by this sensor by measuring the optical power loss in the 5-milimeter (mm) diameter waveguide. Another example is a 0.5-mm diameter dye-doped polydimethylsiloxane optical fiber, which enables quantitative detection of tensile strains by absorption changes of light. Unfortunately, the unique advantages of fiber optic sensors cannot be leveraged without using a real glass optical fiber as the sensor.

In the present disclosure, a soft stretchable multifunction fiber optic sensor is based on the use of a fiber Bragg grating (FBG) in an optical fiber embedded as a sinusoidal configuration in a silicone film at an off-center position. This unique sinusoidal configuration and the flexibility of the silicone film make the sensor highly stretchable and enable the sensing of torsion directions. Embedding the FBG at an off-center position enables the sensing of bi-directional bending. Unlike most known sensors that can only detect a single type of deformations, the stretchable fiber optic sensor of the present disclosure can achieve accurate measurement for tension, torsion (both torsion and direction), and bending (both curvature and direction) of an object. The unique stretching capability, flexibility, and compact structure of the fiber optic sensor of the present disclosure are highly desired in biomedical applications and soft robotics. The material is potentially compatible with human body and can be mounted onto a flexible object that has large movement or deformation during measurement. For example, an adhesive can be applied to one side of the silicone substrate to allow for temporary and/or permanent positioning on the flexible object.

FIG. 1 illustrates an example drawing of a stretchable fiber optic sensor 100 of the present disclosure according to various embodiments. The fiber optic sensor 100 of the present disclosure comprises a deformable substrate 103 and an optical fiber 106 with FBG 109. The deformable substrate 103 can comprise a silicone substrate and/or any other suitable type of deformable substrate as can be appreciated. The optical fiber 106 is embedded as a sinusoidal configuration at an off-centered position of the deformable substrate 103. For example, the deformable substrate 103 can comprise a silicone film and the optical fiber 106 can be embedded at an off-centered layer of the silicone film. While the size of the deformable substrate 103 is not limited to a particular dimension, the size of the deformable substrate illustrated in FIG. 1 is 60 (millimeter) mm×60 mm with a 4-mm thickness. In FIG. 1, a 14-mm long FBG 109 is located in the middle of a sinusoidally-placed optical fiber 106 that is embedded at an off-centered layer in the deformable substrate 103. For example, the optical fiber 106 can be embedded 3 mm away from the top and 1 mm from the bottom.

Figure 2A:
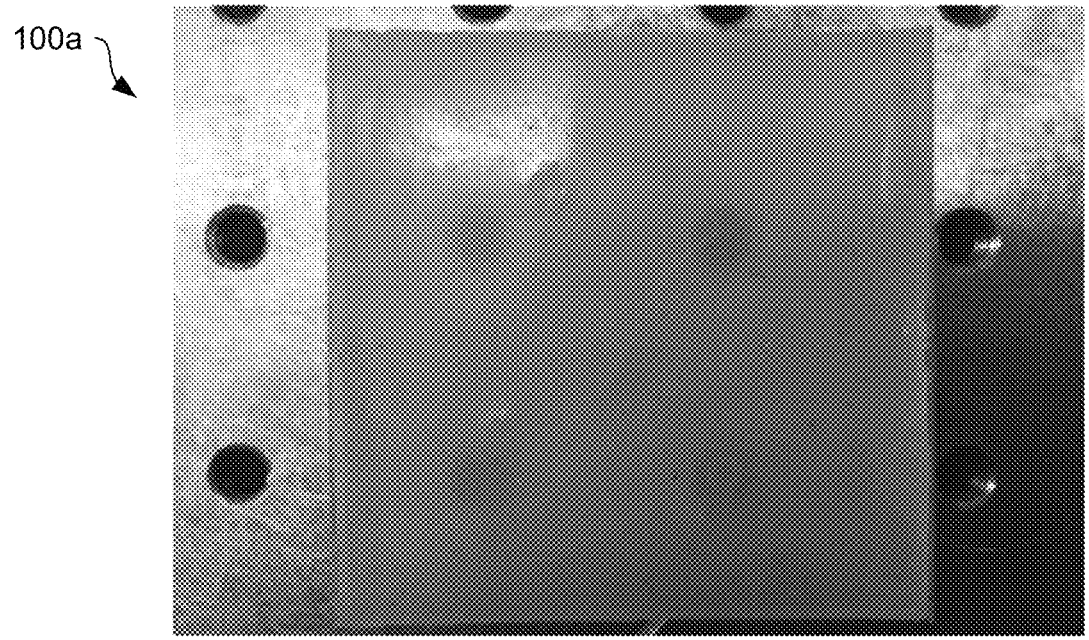
FIGS. 2A and 2B are photos of an example of the fiber optic sensor of FIG. 1, in accordance with various embodiments of the present disclosure.
Figure 2B:
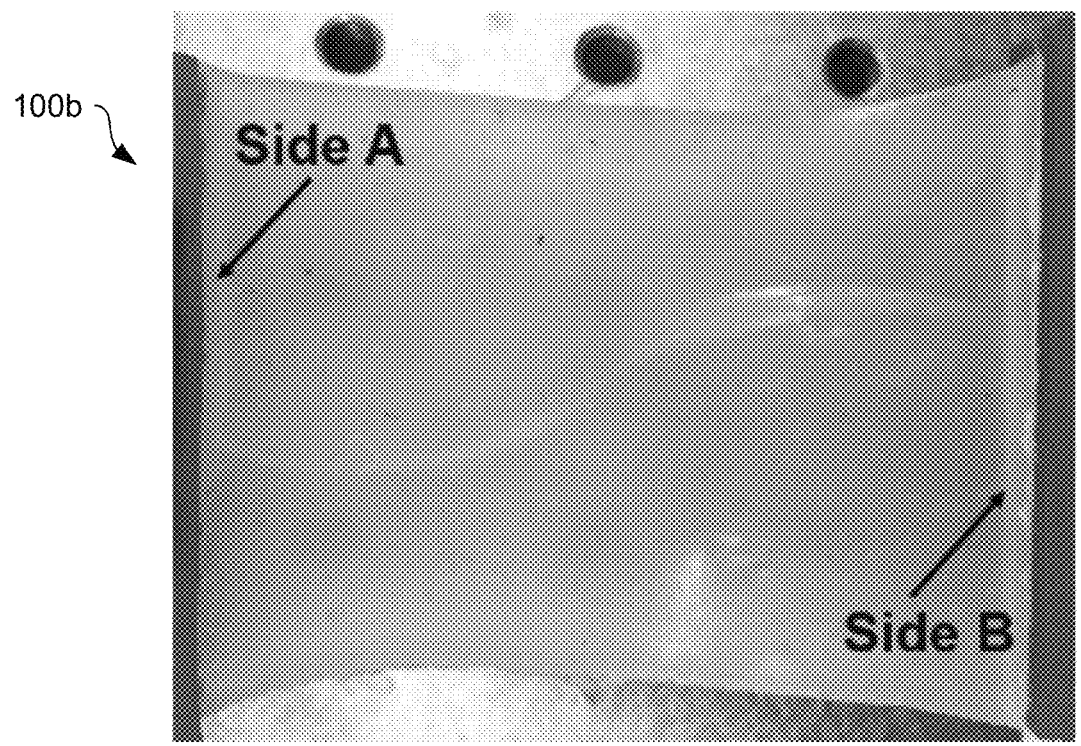

Turning now to FIG. 2A, shown is a photo of an example of a manufactured fiber optic sensor 100a without stretching according to various embodiments of the present disclosure. FIG. 2B is a photo of an example of a manufactured fiber optic sensor 100b under stretching according to various embodiments of the present disclosure. A three dimensional (3D) printed mold having the dimensions of a desired sensor 100 (e.g., 60 mm×60 mm in size and 4-mm depth) can be used to fabricate the stretchable fiber optic sensor 100. In some embodiments, small columns are fixed in the mold to fix the optical fiber 106 in a sinusoidal shape. Small notches on the mold's sidewalls can be used to support the optical fiber 106 at the desired embedded depth. Once the optical fiber 106 is positioned and supported, a deformable substrate mixture (e.g., silicone mixture) can be poured into the mold. For example, the mixture can comprise equal amounts of Ecoflex® 00-10 solutions A and B that are mixed uniformly. Next, the deformable substrate mixture is cured. For example, the curing time of the Ecoflex® mixture is about four hours. Once the deformable substrate mixture has cured, the stretchable fiber optic sensor 100 is ready for use. It should be noted that although the silicone glass material of the optical fiber 106 itself is not stretchable, the sinusoidal configuration enables the FBG 109 written optical fiber 106 to be stretched and elongated with the deformable substrate 103 without fracture, only resulting in a distortion of the sinusoidal shape and a minimal amount of elongation of the fiber 106.

With the unique structure, the stretchable fiber optic sensor 100 of the present disclosure is capable of measuring tension during stretching, bidirectional bending, and bidirectional torsion. When the fiber optic sensor is stretched by a certain tension force, the sensor is elongated in the y-axis direction, which in turn changes the strains of the silicone and the FBG. Therefore, strain in the FBG will lead to a shift in the FBG Bragg wavelength, governed by $$\Delta\lambda/\lambda_0 = (1-p_e)\varepsilon + (\alpha_\Lambda + \alpha_n)\Delta T \qquad \text{Equation (1)}$$

where $\Delta\lambda$ is the resultant wavelength shift, $\lambda_0$ is the initial Bragg wavelength without strain, $p_e$ is photoelastic coefficient, $\varepsilon$ is the strain applied to the FBG, $\alpha_\Lambda$ is the thermal expansion coefficient, $\alpha_n$ is the thermos-optic coefficient and $\Delta T$ is temperature change. According to Equation 1, the resultant Bragg wavelength shift $\Delta\lambda$ has a linear relationship with the applied strain $\varepsilon$. As such, the strain and tension force can be obtained by measuring the Bragg wavelength shift using an optical spectrum analyzer and calculated using Equation 1.

Figure 3:
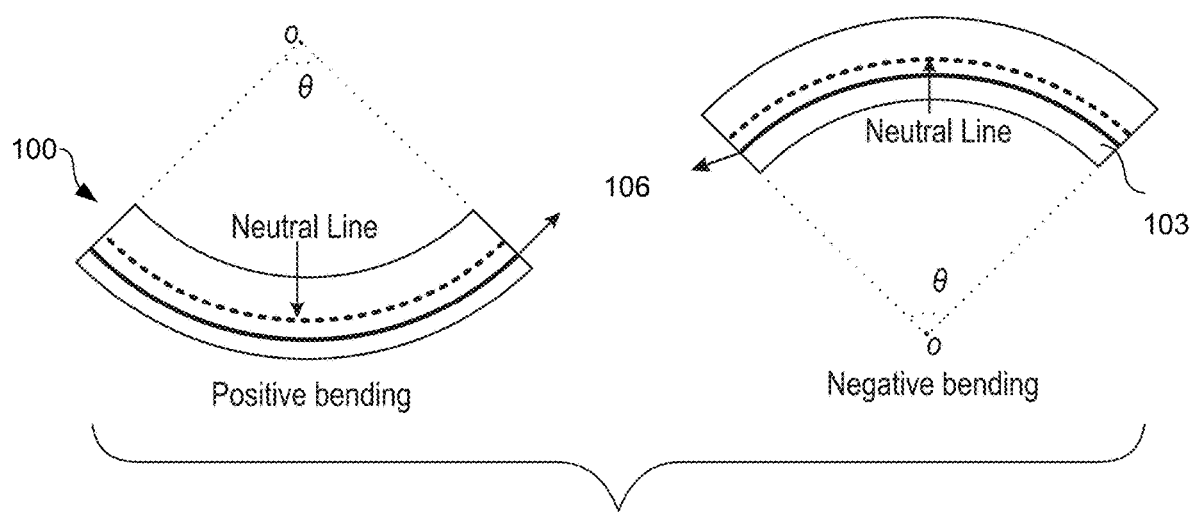
FIG. 3 is an illustration of an example a measurement mechanism of the fiber optic sensor of FIG. 1 when measuring an object with positive and negative bending directions, in accordance with various embodiments of the present disclosure.

Another parameter the fiber optic sensor can measure is the curvature and direction of a bending. FIG. 3 illustrates an example of the stretchable fiber optic sensor 100 when measuring an object with positive and negative bending directions. The measurement of bending direction of the fiber optic sensor 100 of the present disclosure is enabled by embedding the FBG 109 at an off-center position in the z-axis. When the FBG 109 is embedded off-center, (e.g., below the neutral line of the deformable substrate 103), the FBG 109 is stretched when the sensor 100 is put on an object with a positive curvature (concave), resulting in a right shift in the FBG Bragg wavelength. On the other hand, the FBG 109 will be compressed if the sensor 100 is put on an object with a negative curvature (convex), resulting in a left shift in the FBG Bragg wavelength. This observation can be explained by the pure bending model in mechanical engineering. Thus, bending curvatures and bending directions can be measured from the amount of Bragg wavelength shift and the direction of the shift, respectively.

Figure 4:
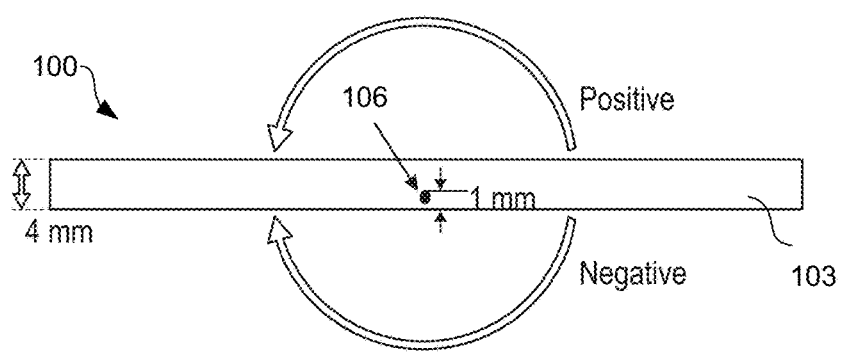
FIG. 4 is an illustration of an example of a cross-section view of the fiber optic sensor of FIG. 1 showing positive and negative torsion directions, in accordance with various embodiments of the present disclosure.

The stretchable fiber optic sensor 100 of the present disclosure can further measure torsion direction and an amount of torsion. FIG. 4 illustrates an example of a cross-section of the fiber optic sensor 100 of FIG. 1 according to various embodiments of the present disclosure. In particular, FIG. 4 illustrates the cross section of the fiber optic sensor 100 at side B showing the positive and negative torsion directions. Since the FBG 109 is fixed in a sinusoidal configuration, as shown in FIG. 1, the FBG 109 is stretched when the sensor 100 has a positive torsion (FIGS. 1 and 4), resulting in a right shift in the Bragg wavelength. On the other hand, the FBG 109 is compressed when the sensor 100 has a negative torsion, resulting in a left shift in the Bragg wavelength.

Figure 5A:
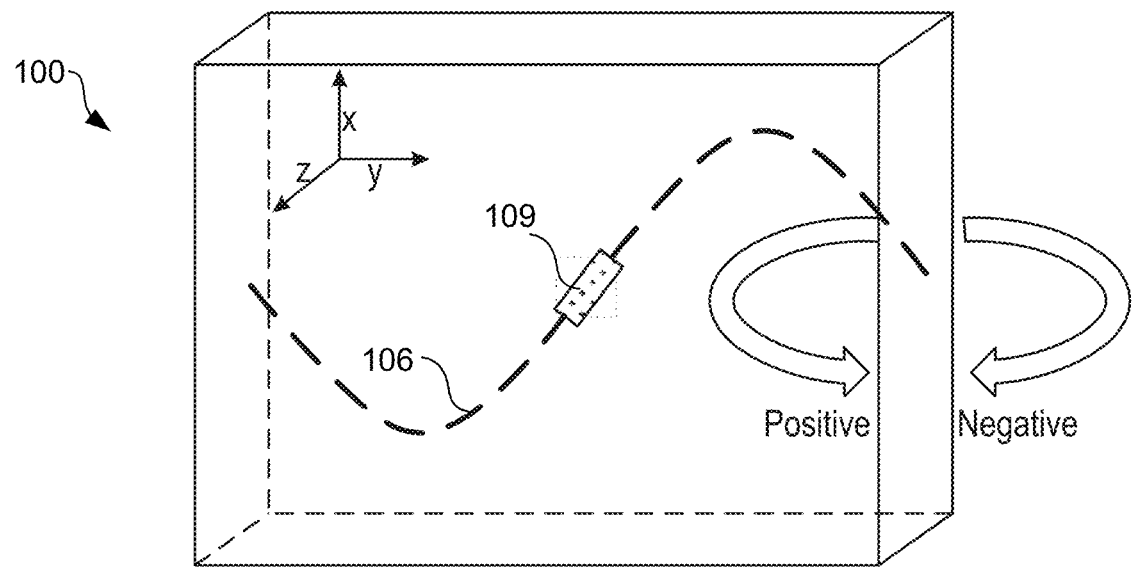
FIGS. 5A-5C include example illustrations of the stretchable fiber optic sensor of FIG. 1 under a torsion experiment according to various embodiments of the present disclosure.
Figure 5B:
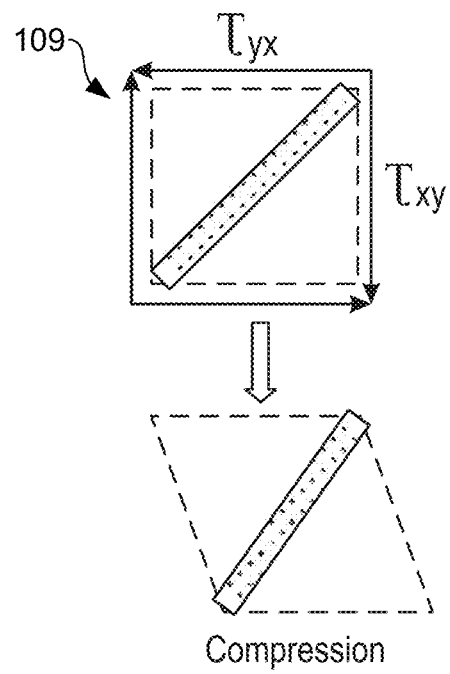
Figure 5C:
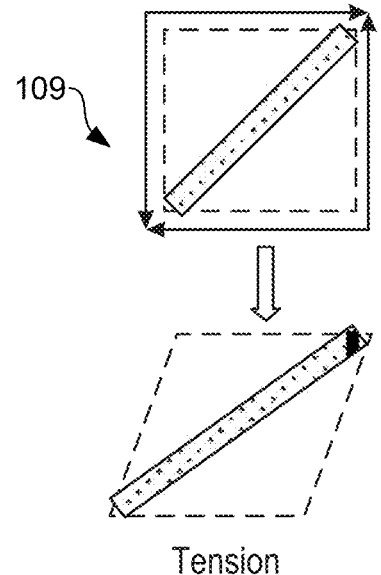

FIGS. 5A-C illustrate examples of the stretchable fiber optic sensors 100 under a torsion experiment according to various embodiments of the present disclosure. FIG. 5A illustrates an example of a schematic view of the torsion experiment where the FBG 109 is marked by the black square. FIG. 5B illustrates an example of the strain response of the FBG 109 under negative torsion. FIG. 5C illustrates an example of the strain response of the FBG 109 under positive torsion. The sensor 100 is tested by twisting the fiber optic sensor 100 along the y-axis, i.e. Side A is fixed while Side B is rotated anti-clockwisely/clockwisely, as illustrated in FIG. 1. Since the axis of the FBG 109 is not parallel to the rotation axis of torsion (FIG. 5A), the angle between the axis of FBG 109 and the axis of rotation is around 45°, which is marked by the dashed black square. Under negative twisting, the stress status of FBG 109 can be assumptively regarded as pure shear shown in FIG. 5B, which induces compression (negative strain) along the FBG direction. FBG 109 is stretched under positive twisting because the shear stress direction is reversed. Note that the above derivation is based on the assumption that the sensor 100 is under pure torsion while there is certainly some degree of in-plane warping for the cross-section of rectangular prism when it is under torsion.

In an experiment, a broadband light source with wavelength from about 1290 nanometers (nm) to about 1660 nm was launched into the FBG as the input light. The embedded FBG was about 14 mm long with a Bragg wavelength at about 1549.8 nm. The FBG Bragg wavelength was measured by an optical spectrum analyzer (OSA) with a resolution of about 0.8 picometers (pm). By analyzing the direction and the amount of wavelength shift in the FBG, tension, bending, and torsion can be measured.

To measure the relationship between Bragg wavelength shift and tension applied to the stretchable sensor, side A of the fiber optic sensor of FIG. 2 remained fixed while side B was pulled using a uniform loading, which corresponding to force ranges from about 0.59 Newtons (N) to about 2.14N. As tension force is applied on the sensor 100, the sinusoidal optical fiber 106 unfolds accordingly, resulting in straightening and stretching of the FBG 109. Straightening of the FBG 109 does not contribute directly to the strain of the FBG 109 but reduces the angle between its axial direction and the direction where tensile force is applied. On the other hand, the stretching of the FBG 109 contributes to the strain of the FBG 109, leading to a shift of the FBG Bragg wavelength.

Figure 6A:
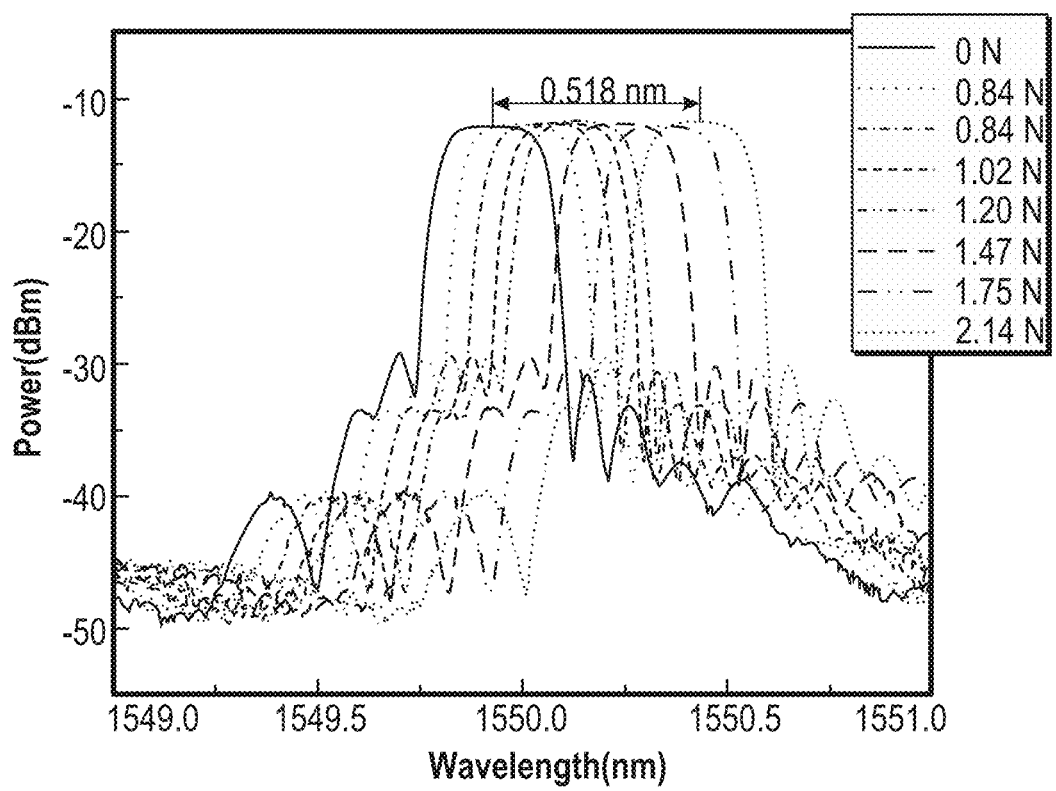
FIG. 6A is a plot illustrating examples of measured fiber Bragg grating (FBG) spectra with different tension forces applied to the fiber optic sensor of FIG. 1, in accordance with various embodiments of the present disclosure.
Figure 6B:
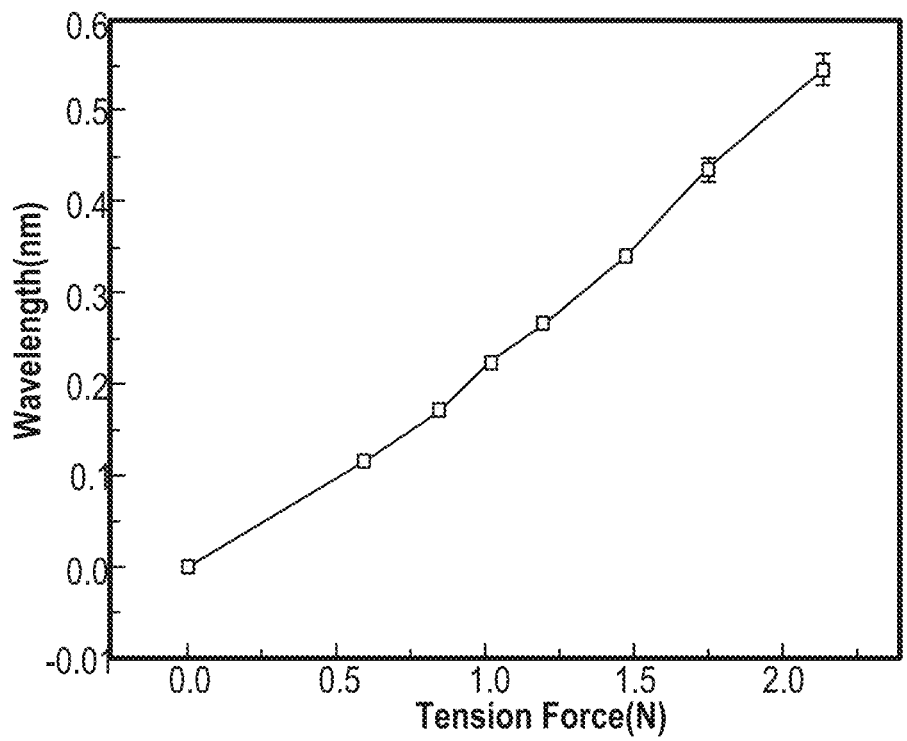
FIG. 6B is a plot illustrating examples of the relationship between wavelength shift and applied tension force to the fiber optic sensor of FIG. 1, in accordance with various embodiments of the present disclosure.

In the tensile experiment, force is applied to the sensor 100 using a pulley and different weights from 60 grams (g) to 218 g, corresponding to gravity from 0.59 N to 2.14 N. Optical spectrum of the FBG 109 inside the stretchable sensor can be measured using an OSA. The measured optical spectra of the FBG 109 with different tension forces is shown in FIG. 6A. In particular, FIG. 6A shows a total of about 0.518 nm shift in Bragg wavelength when the applied tension force increases from 0 N to 2.14 N. The relationship between wavelength shift and applied tension force is shown in FIG. 6B. A linear relationship is observed with small error bars and sensitivity of 0.25 nm/N. Since the FBG optical fiber 106 is embedded in a deformable substrate 103 with a sinusoidal configuration, the FBG 109 embedded sensor 100 can be stretched and elongated by about thirty percent (30%) when a tension force of about 2 N is applied. The stretchability of the fiber optic sensor 100 is dues to the unique sinusoidal configuration of the FBG 109 written optical fiber 106 and the stretchable property of the deformable substrate 103. This unique structure enables a sensor 100 using a conventional optical fiber 106 to be stretched and deformed with respect to the object under measurement.

Under a constant temperature, the strain along FBG 109 and the Bragg wavelength shift have a linear relationship described by $$\frac{\Delta \lambda}{\lambda_0} = (1 - p_e)\varepsilon \qquad \text{Equation (2)}$$

Figure 6C:
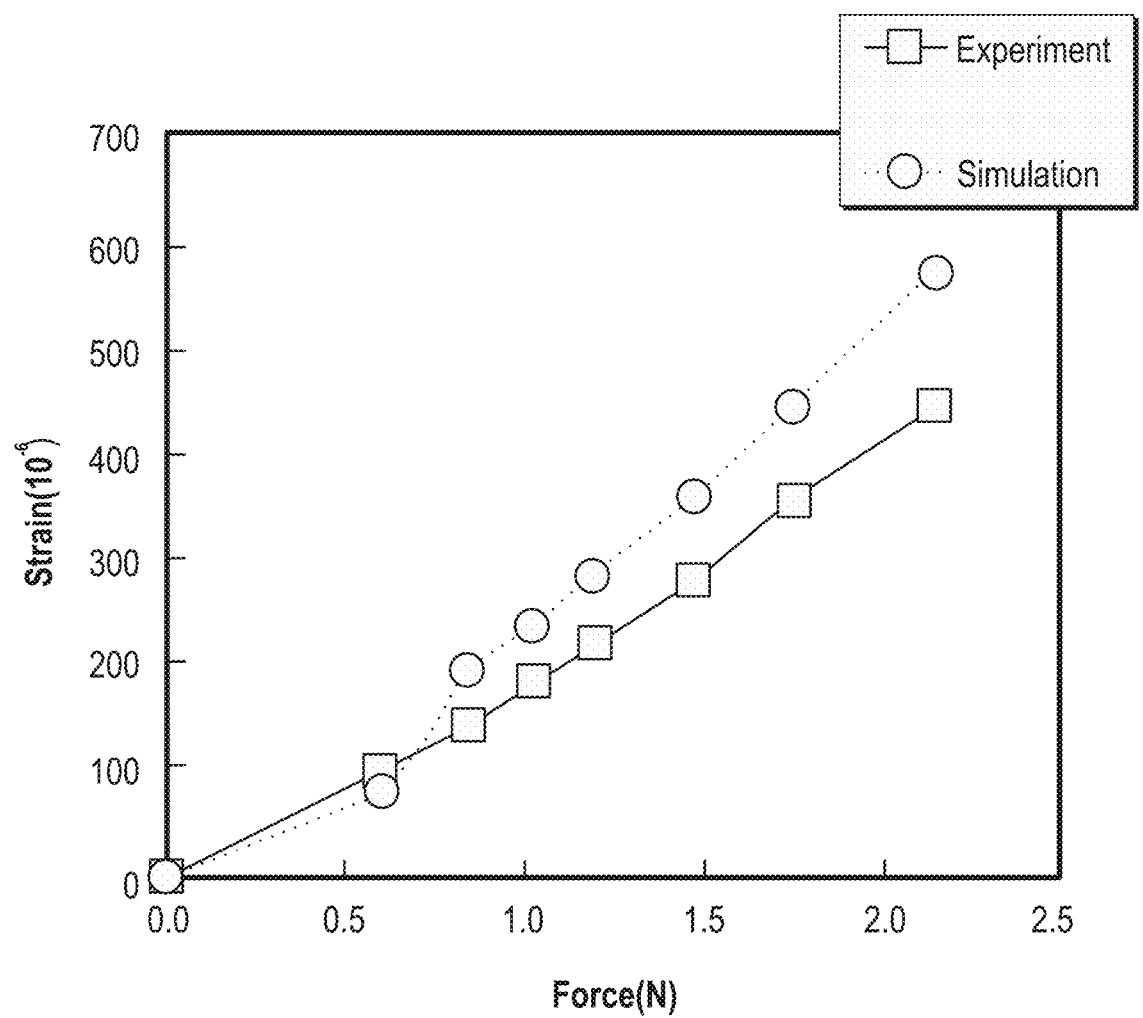
FIG. 6C is a plot illustrating measured strain with different applied tension force, in accordance with various embodiments of the present disclosure.

For the optical fiber 106, the photoelastic coefficient $p_e$ is governed by $$p_e = \frac{n^2}{2[p_{12} - v(p_{11} - p_{12})]} \qquad \text{Equation (3)}$$

Where n is the effective refractive index of the optical fiber, $p_{11}$ and $p_{12}$ are the Pockel's coefficients of the stress-optic tensor and v is the Poisson's ration. For a typical optical fiber with silica material v=0.17 and the photoelastic coefficient $p_e$ will have an approximate numerical value of 0.22. Therefore, the relationship between the strain along the FBG 109 and the applied force can be obtained as shown in FIG. 6C. FIG. 6C illustrates measured strain with different applied tension force. Similar results are obtained in simulation. Both of the measurements in simulation and experiment show a linear proportional relationship between strain and applied force. Note that initially the curve in the simulation is not linear. In fact, the strain of FBG 109 is not solely determined by the magnitude of the force while it also depends on the angle between the axial direction of FBG 109 and the direction where force is applied.

At the very beginning, due to unfolding of the sinusoidal optical fiber 106, the change in the angle between FBG 109 and force is significant, which causes nonlinearity for the strain-force curve. However, as the tension force further increases, the change in the angle between FBG 109 and force becomes marginal. As such, it can be assumed that the strain in FBG 109 is barely a function of the applied force, making the strain-force curve linear. This discrepancy between simulation and experimental results may be due to the imperfect three-dimensional (3D) printing of the mold and the exact embedded position of the FBG 109.

Figure 7A:
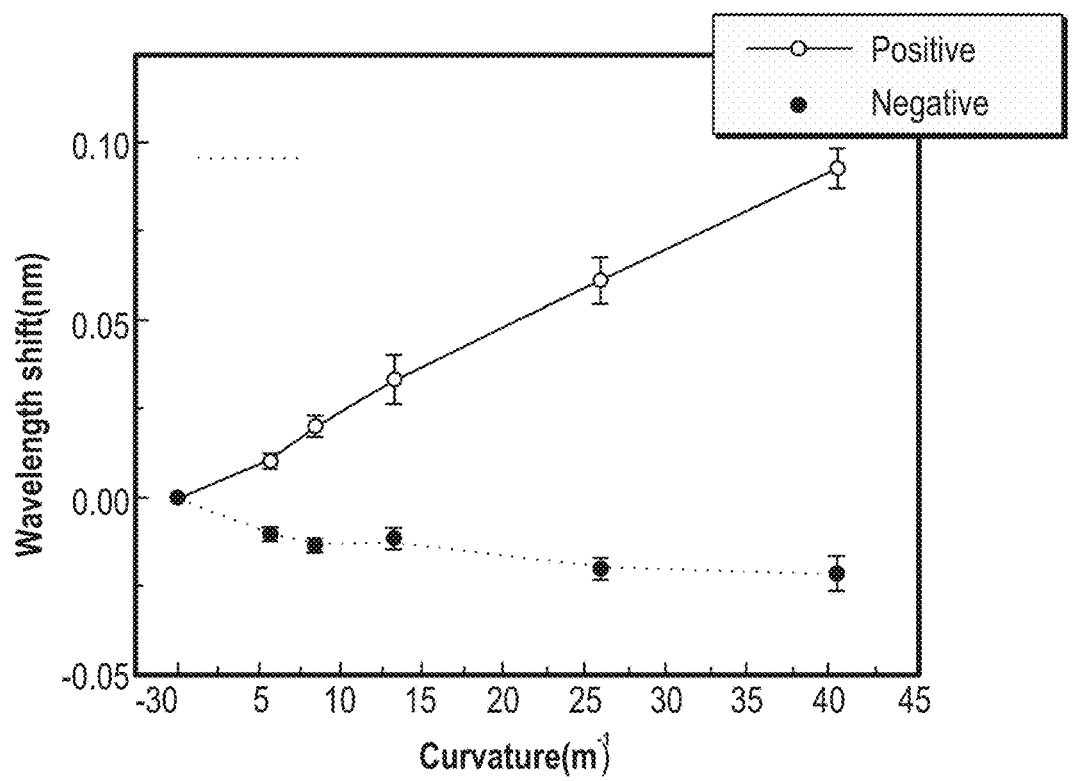
FIG. 7A is a plot illustrating the measured wavelength shifts of the fiber optic sensor of FIG. 1 in response to bending curvatures for both positive and negative directions, in accordance with various embodiments of the present disclosure.

Next, the fiber optic sensor 100 was tested for its bi-direction curvature sensing capability. As the FBG 109 was embedded at an off-center position in the z-axis, positive bending and negative bending of the sensor 100 resulted in stretching and compression of the FBG 109, respectively. The bending curvature C is expressed in terms of the bending radius R, such that C=1/R. Ten cylindrical objects with different positive and negative curvatures between 5.62 m$^{-1}$ to 43.48 m$^{-1}$ were used to study and calibrate the relationship between Bragg wavelength shifts and bending curvature. Both positive and negative bending results are shown in FIG. 7A, which is a graphical representation of the measured wavelength shifts of the fiber optic sensor 100 in response to bending curvatures for both positive and negative directions according to various embodiments. FIG. 7A illustrates a linear relationship between Bragg wavelength shift and bending curvature for both bending directions. Sensitivity of 2.3 pm/m$^{-1}$ and −0.49 pm/m$^{-1}$ are resulted for positive and negative bending, respectively.

Figure 7B:
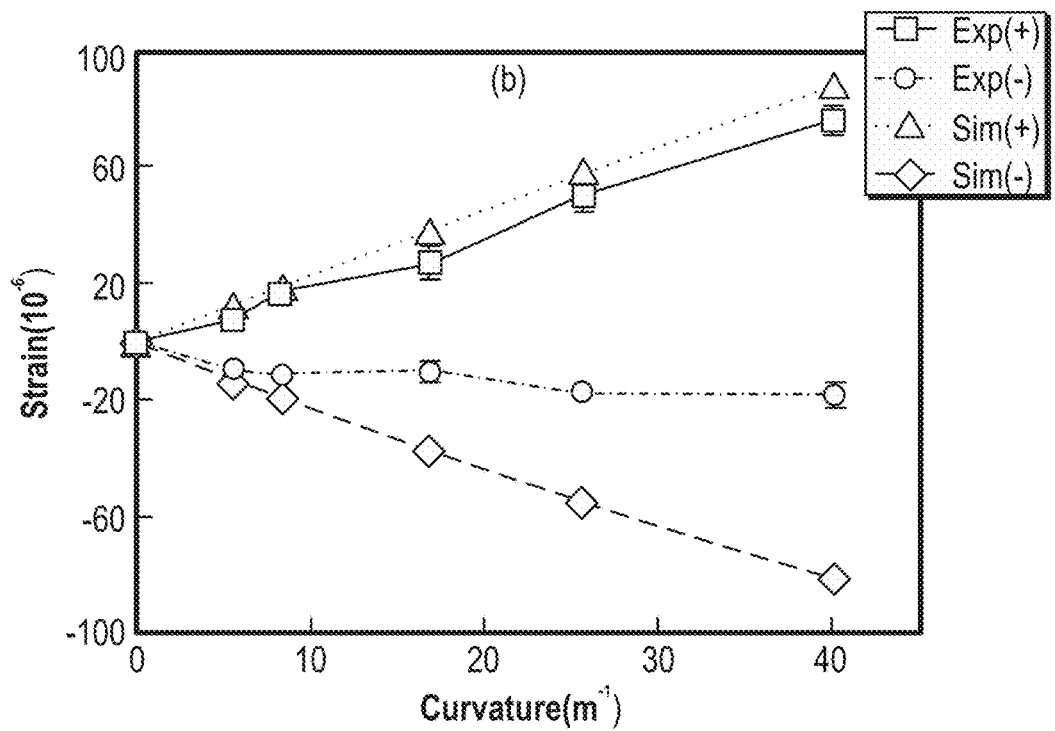
FIG. 7B is a plot illustrating measured strain in response to bending curvatures for both positive and negative bending directions of the fiber optic sensor of FIG. 1, in accordance with various embodiments of the present disclosure.

FIG. 7B illustrates a graphical representation of measured strain in response to bending curvatures for both positive and negative bending directions. In FIG. 7B, wavelength shift is converted to strain to compare with the simulation results. Although simulation results for positive bending are in good agreement with experimental results, those for negative bending are greater than those from the experimental ones, which may be caused by the stretching of the sensor 100 due to gravitational force that counter act with the compression on the FBG 109 when placed on a negatively bend object. Accurate curvature measurement can still be obtained through calibration of the wavelength and curvature relationship.

Figure 8A:
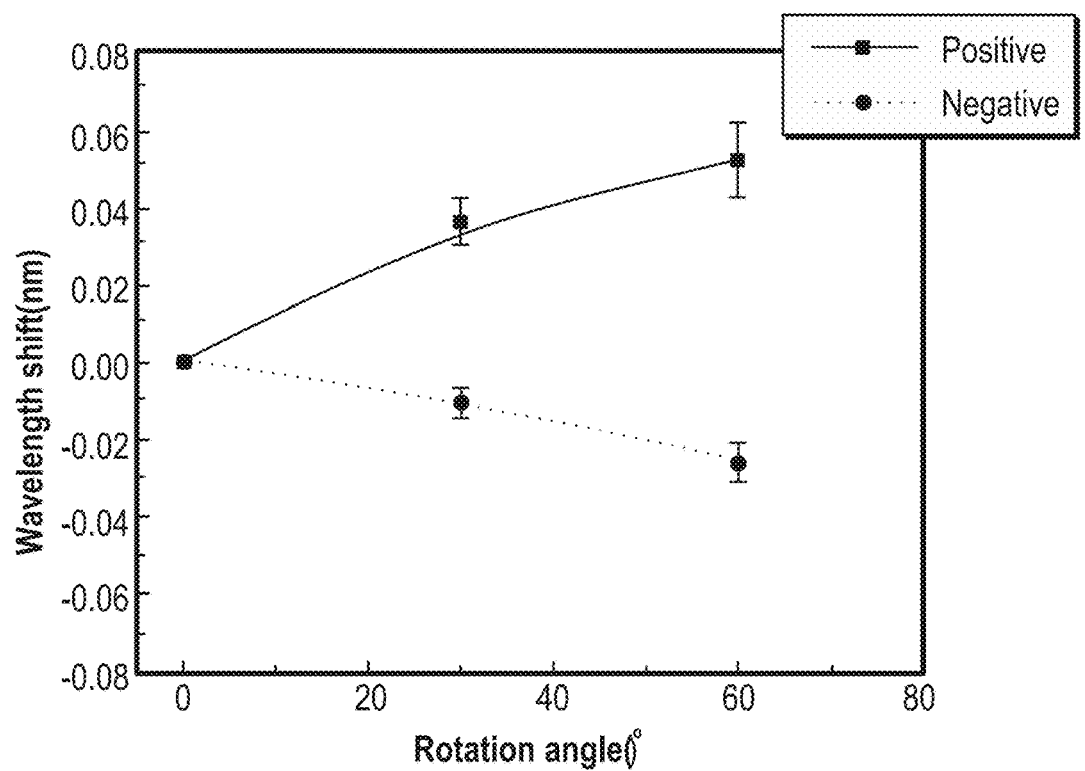
FIGS. 8A-8C are plots illustrating measured wavelength shifts of the fiber optic sensor of FIG. 1 in response to different rotation angles for both positive and negative torsion directions, in accordance with various embodiments of the present disclosure.

Next, the relationship between Bragg wavelength shift and the torsion direction and amount of torsion in the stretchable sensor 100 is determined. Side A of the fiber optic sensor of FIG. 2 is fixed while Side B of the sensor is twisted to different directions and angles. Positive and negative torsion directions are defined as Side B is twisted anticlockwise and clockwise, respectively, as illustrated in FIG. 3. FIG. 8A is a graphical representation of measured wavelength shifts of the fiber optic sensor 100 in response to different rotation angles for both positive and negative torsion directions. As shown in FIG. 8A, when side B is twisted anticlockwise, the FBG 109 is stretched and an increase in Bragg wavelength is observed. When side B is twisted clockwise, the FBG 109 is compressed and a decrease in Bragg wavelength is observed. The result is that the larger the rotation angle, the larger the wavelength shift.

Figure 8B:
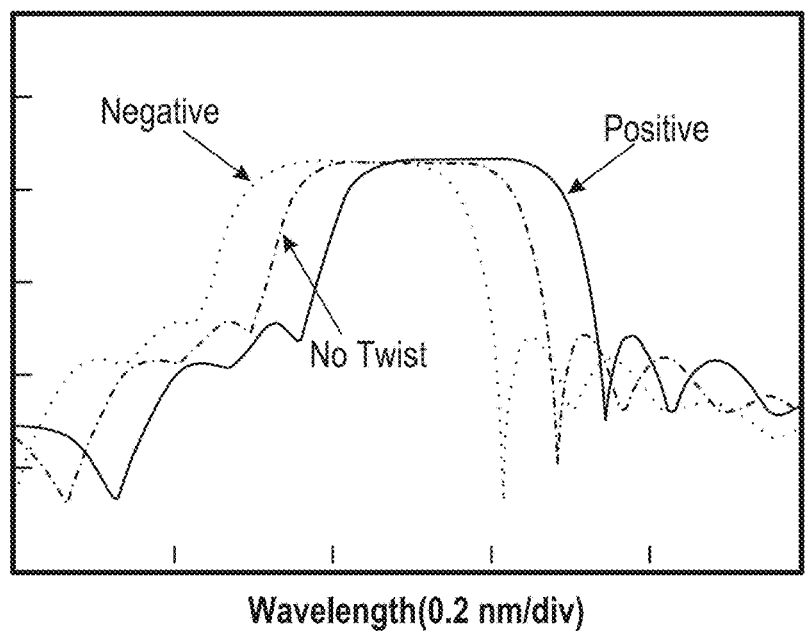
Figure 8C:
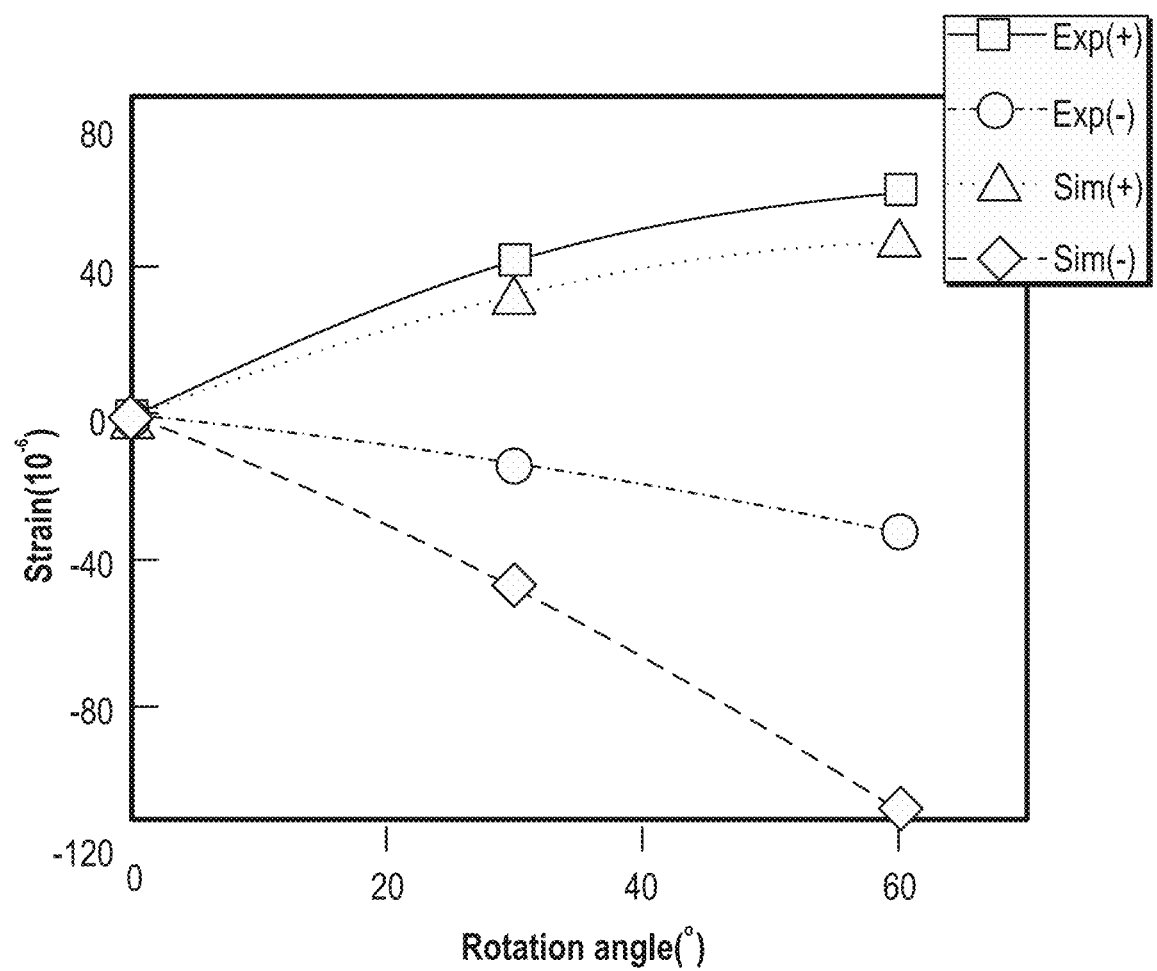

FIG. 8B shows the sample optical spectra before and after twisting. As shown in FIG. 8B, a positive torsion will stretch the FBG 109 (positive strain) and result in an increase in Bragg wavelength, while a negative torsion will compress the FBG 109 (negative strain) and result in a decrease in Bragg wavelength. FIG. 8C illustrates an example graphical representation of the measured strain under various rotation angles and directions. A linear trend is observed in the relationship between the twisting angle and strain (wavelength shift). Furthermore, a larger wavelength shift is observed when the twisting angle is larger (i.e., larger strain). Therefore, the stretchable sensor 100 of the present disclosure can sense torsion direction. However, precise calibration may be needed to provide accurate torsion angle information.

To verify our observation, simulation is carried out to identify the strain on the FBG during twisting, as shown in FIG. 8C. Although there is discrepancy between the simulation and experimental results—due to the small sliding between the FBG 109 and the silicone film 103, a similar trend as in the experiment can be observed—positive rotation results in positive strain, while negation rotation results in negative strain, proving that the proposed stretchable sensor 100 can also serve as a torsion direction sensor.

As previously discussed, the stretchable sensor 100 of the present disclosure can be used in soft robotic applications. Soft robots are made from soft, elastic materials and are capable of mimicking complex motions of human and animals. It offers unique opportunities in areas where conventional rigid robots are not a viable solution. Embedded soft sensors are important for soft robots to sense and response to its surroundings, such that delicate and sensitive tasks can be performed by soft robots. Unfortunately, most sensors are made out of conventional electronics, which are rigid and not suitable for soft robotic applications. Stretchable electronic sensors including the use of liquid metal, printable conductor, braided conductive wires have been developed to overcome the challenge. These approaches are based on the change in resistance, conductance, and capacitance induced by the change in physical phenomenon; therefore, these sensors cannot survive harsh environments that could be corrosive, explosive, or under the effect of strong electromagnetic field.

Alternatively, a fiber optic sensor has a number of unique advantages compare with its electronics counterpart, and has been used in both rigid and hybrid soft-rigid robots. Hybrid soft-rigid robots consist of an internal rigid framework with soft exteriors, which are neither flexible nor elastic. In soft robots, elongation and continuum deformation allow for increased flexibility and adaptability for accomplishing tasks, but it also inhibited the use of conventional fiber optic sensor in soft robotics due to the stiffness and the lack of stretchability of an optical fiber. Conventional glass optical fiber is not stretchable, making it impossible to follow the deformation and movement of the soft robot. There are a few stretchable fiber optic sensors that are based on light-guiding mechanism in a waveguide; however, none of them are actually using conventional glass optical fiber—meaning that they do not carry all the advantages of using optical fiber as a sensor.

According to various embodiments of the present disclosure, a soft robotic gripper can be embedded with a stretchable fiber Bragg grating (FBG) sensor of the present disclosure. For example, two FBG sensors are embedded sinusoidally in two of the arms of the soft robotic gripper. The unique two dimensional (2D) "slinky" structure enables 30% elongation in the FBG sensor 100, allows the use of conventional glass fiber as a stretchable sensor in soft robots, and preserves all the unique advantages of fiber optic sensors. The FBG sensor embedded soft robotic gripper of the present disclosure is capable of picking up objects of different size and weight, and can successfully sense and distinguish various motions and status of the gripper through spectral shift and power change measurements.

Figure 9A:
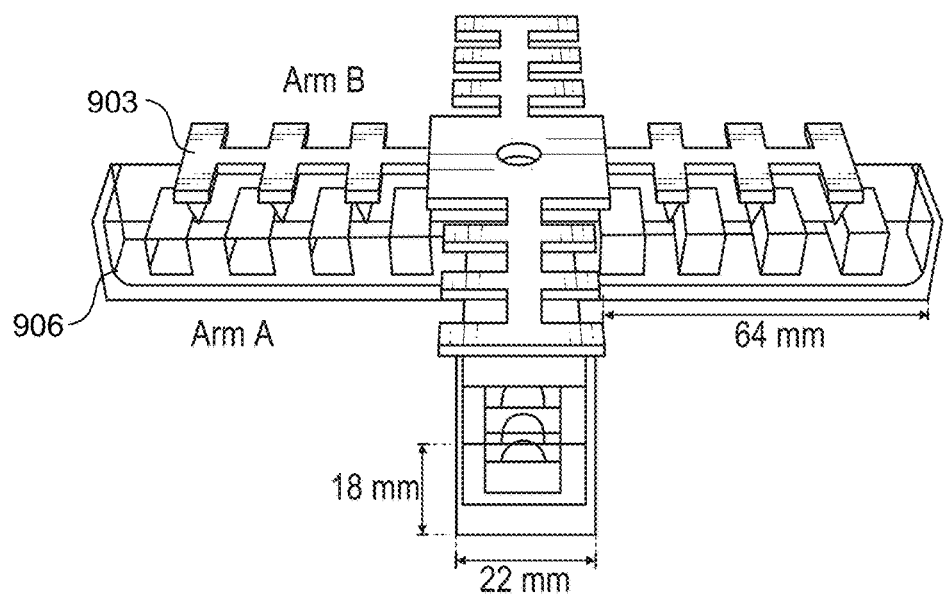
FIGS. 9A-9B are example molds for a robotic gripper including a fiber optic sensor according to various embodiments of the present disclosure in accordance with various embodiments of the present disclosure.
Figure 9B:
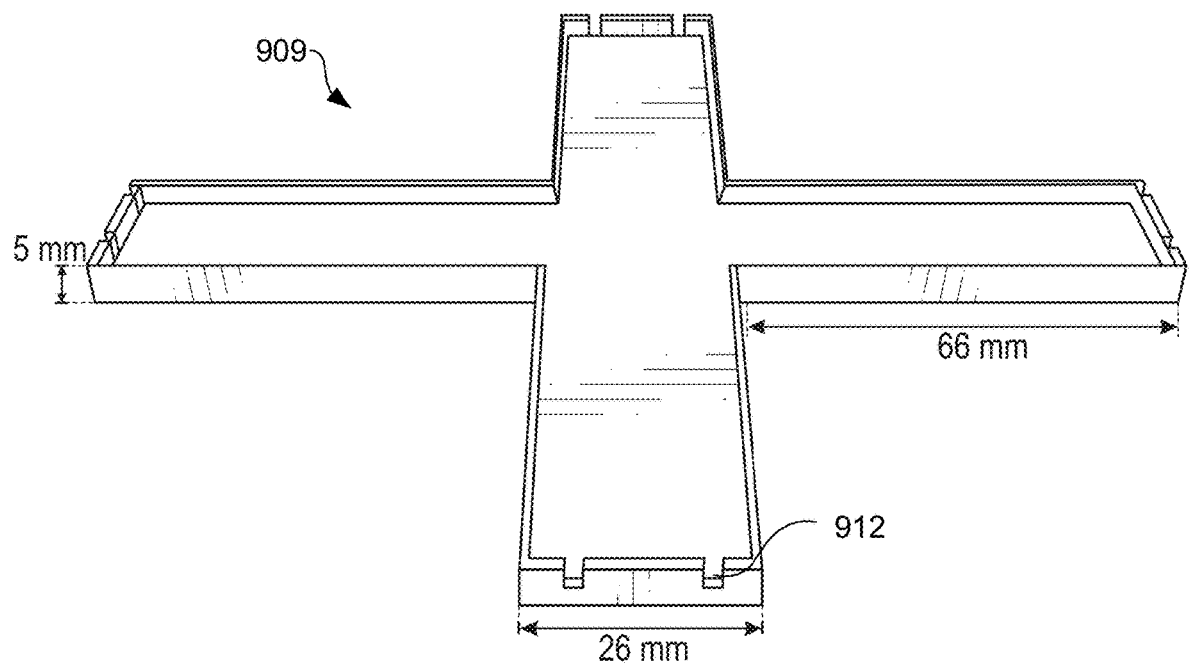

FIGS. 9A and 9B illustrate example molds for a robotic gripper according to various embodiments of the present disclosure. To fabricate the soft robotic gripper and embed FBG sensors 100 to its arms, a 3D printer can be used, for example, to print out a number of molds, including top 903 of the gripper arms, bottom 906 of the gripper arms, the base 909 for embedding FBG sensors, and a air channel 912. For example, FIG. 9A illustrates the top of the gripper arms and the bottom of the gripper arms while FIG. 9B illustrates the base for embedding FBG sensors 100 and an air channel 912.

According to an experiment, silicone gel from Ecoflex is used to construct a soft robotic gripper 900 (FIGS. 10A-D). Equal amount of 00-30 solution A and B can poured into the bottom mold 906 of the gripper arm, the top mold 903 of the gripper arm is placed on top of the solution to create the grooves. The silicone gel is cured at 60° C. for 30 mins. To fabricate the base of the gripper for embedding the FBG optic fibers 106, equal amount of 00-50 solution A and B are poured into the base mold 909 with the FBG fiber 106 placed at 1 mm away from the bottom. The FBG optic fiber 106 is placed sinusoidally in the base 909 to enable stretching when the gripper is activated. When both the arms and the base are cured, a thin layer of 00-30 mixture is used to attach the base to the gripper arm. The length of each gripper arm is about 64 mm, and has a width of about 22 mm. The two embedded FBGs are about 1-cm in length and their reflection wavelength are at about 1545.04 nm and about 1547.53 nm.

Figure 10A:
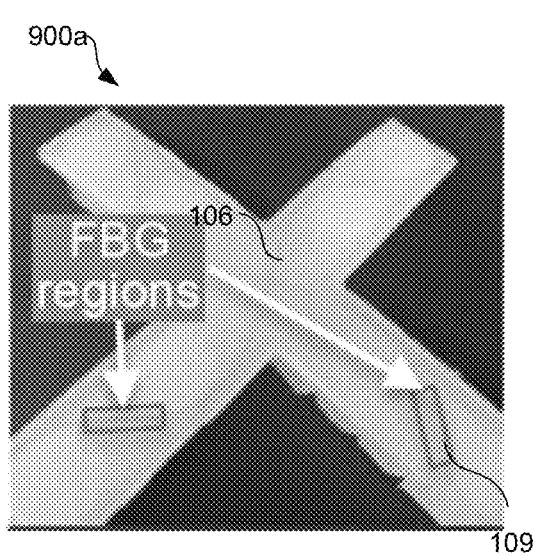
FIGS. 10A-10D are examples of robotic grippers in accordance with various embodiments of the present disclosure.
Figure 10B:
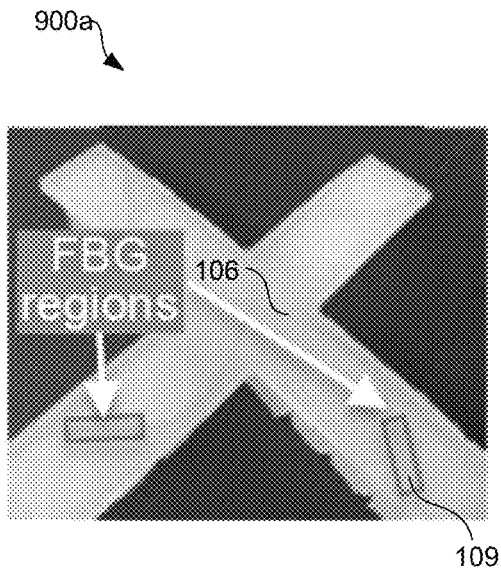
Figure 10C:
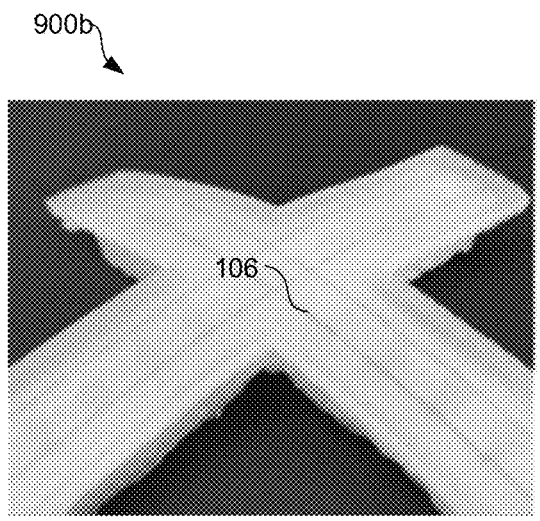
Figure 10D:
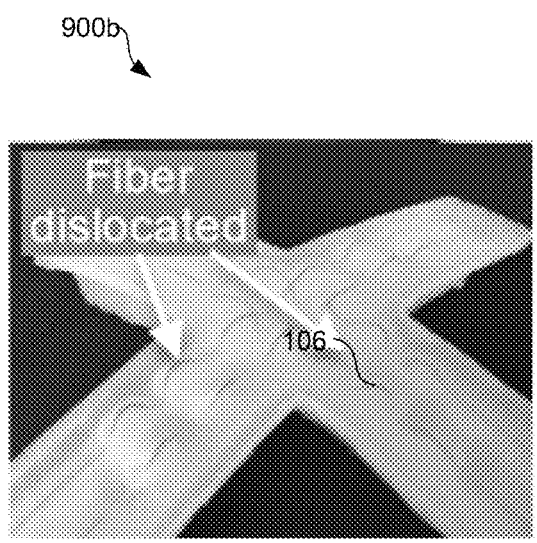

FIGS. 10A-10D illustrate examples of a robotic gripper 900 (e.g., 900a, 900b) according to various embodiments of the present disclosure. FIG. 10A illustrates a soft robotic gripper 900a with sinusoidally embedded FGB optic fibers 106 before activation. FIG. 10B illustrates the soft robotic gripper 900a with sinusoidally embedded FBG sensors 106 after activation. FIG. 10C illustrates a soft robotic gripper 900b with straight embedded FBG sensors 106 before activation. FIG. 10D illustrates an example of the soft robotic gripper 900b of FIG. 10C after activation and shows that the fibers 106 are dislocated from the original position.

Since the gripper arms have the largest motions closer to the tip, the FBG optic fibers 106 are embedded at the ¼ position in two of the gripper arms, as shown in FIGS. 10A-B. The soft robotic gripper 900 can be activated by pumping air through the top air channel. Due to the internal structure of the gripper arms, the arms will be bent inward when air is pumped. The resultant soft robotic gripper 900a before and after activation are shown in FIGS. 10A and B, respectively. No dislocation of the FBG sensors 106 is observed during and after the gripper 900a is activated, which verify that the sinusoidal structure is a promising way to embed the FBG sensor. For comparison, FIGS. 10C and 10D illustrate a fiber optic sensor 106 in the gripper 900b using a straight configuration. Dislocation is observed during activation of the gripper 900b and the optical fiber 106 does not return to its original position after activation, as shown in FIG. 10D. Therefore, it is critical to use the proposed sinusoidal embedding structure to enable the use of conventional glass optical fiber 106 as a stretchable sensor 100 in soft robotics.

Figure 11:
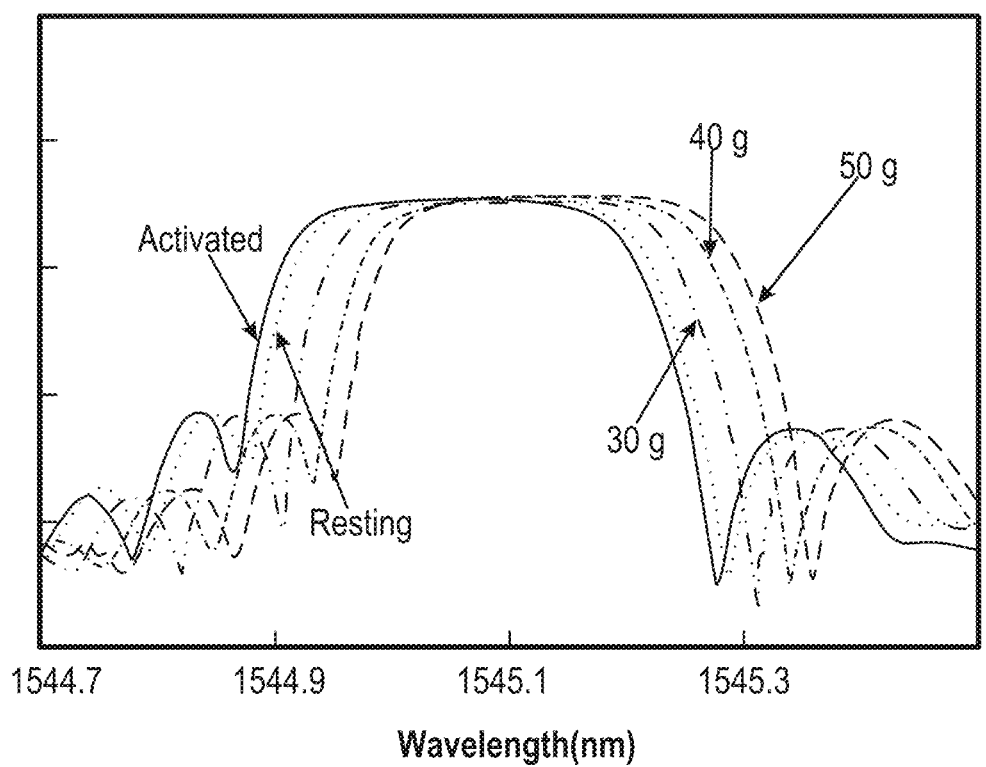
FIG. 11 is a plot illustrating the optical spectra of the fiber Bragg grating (FBG) optic fiber embedded in a robotic gripper accordance with various embodiments of the present disclosure.
Figure 12:
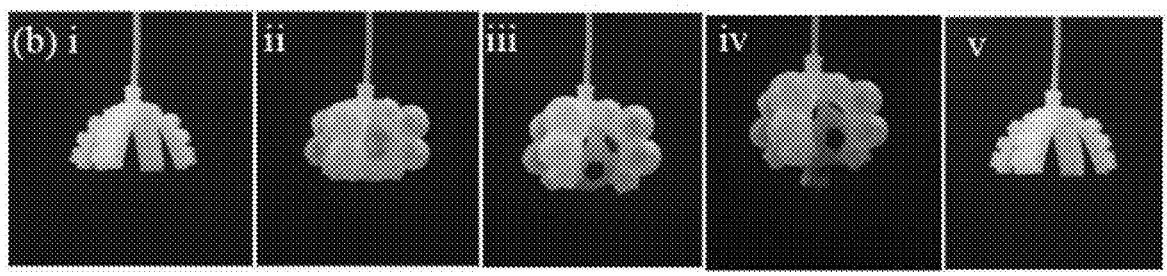
FIG. 12 illustrates photos of a soft robotic gripper performing a series of motions in accordance with various embodiments of the present disclosure.

The soft gripper 900 can be used to pick up objects of different weight and different size. To observe the optical spectrum of the two embedded FBG sensors, a broadband light source at C band and an optical spectrum analyzer with resolution of 0.8 pm are used. First, the gripper 900 picks up a ball with diameter of 60 mm and different weight ranged between 30 g-50 g. FIG. 11 illustrates an example graphical representation of the optical spectra of the FBG 109 in Arm A, when the gripper 900 is not activated—resting state, gripper is activated without picking up an object, gripper is activated and is picking up a ball of 30, gripper is activated and is picking up a ball of 40 g, as well as when gripper is activated and is picking up a ball of 50 g. FIG. 12 illustrates photos of the soft robotic gripper 900 performing a series of motions: (i) resting (ii) gripper is activated but not picking up anything (iii) gripper is picking up a ball with weight of 30 g, (iv) gripper is picking a ball with weight of 40-50 g, (v) gripper is deactivated and back to resting.

Figure 13:
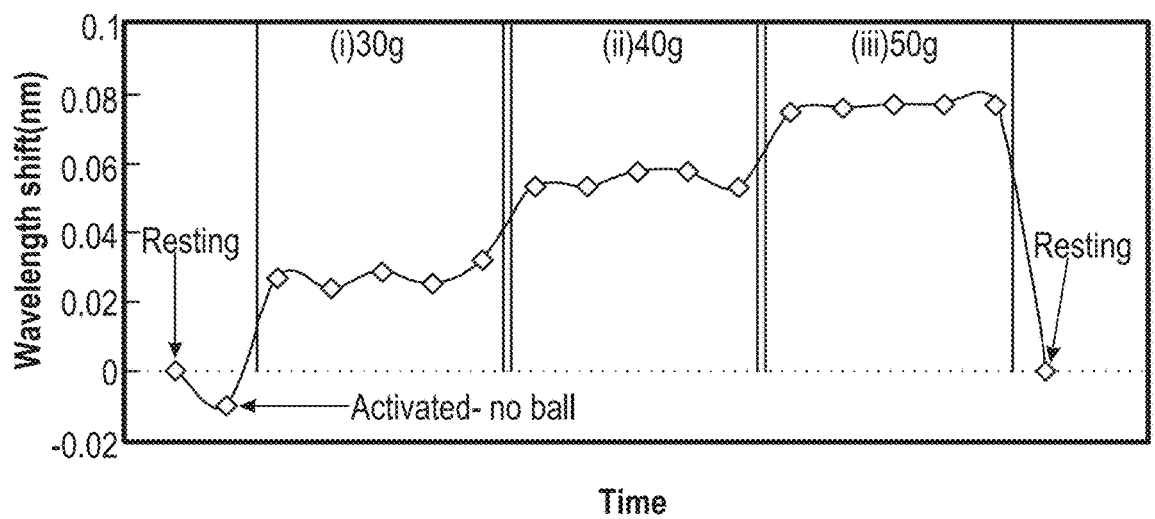
FIG. 13 is a plot illustrating the FBG reflection peak wavelength shift when the robotic gripper performs a series of tasks in accordance with various embodiments of the present disclosure.
Figure 14:
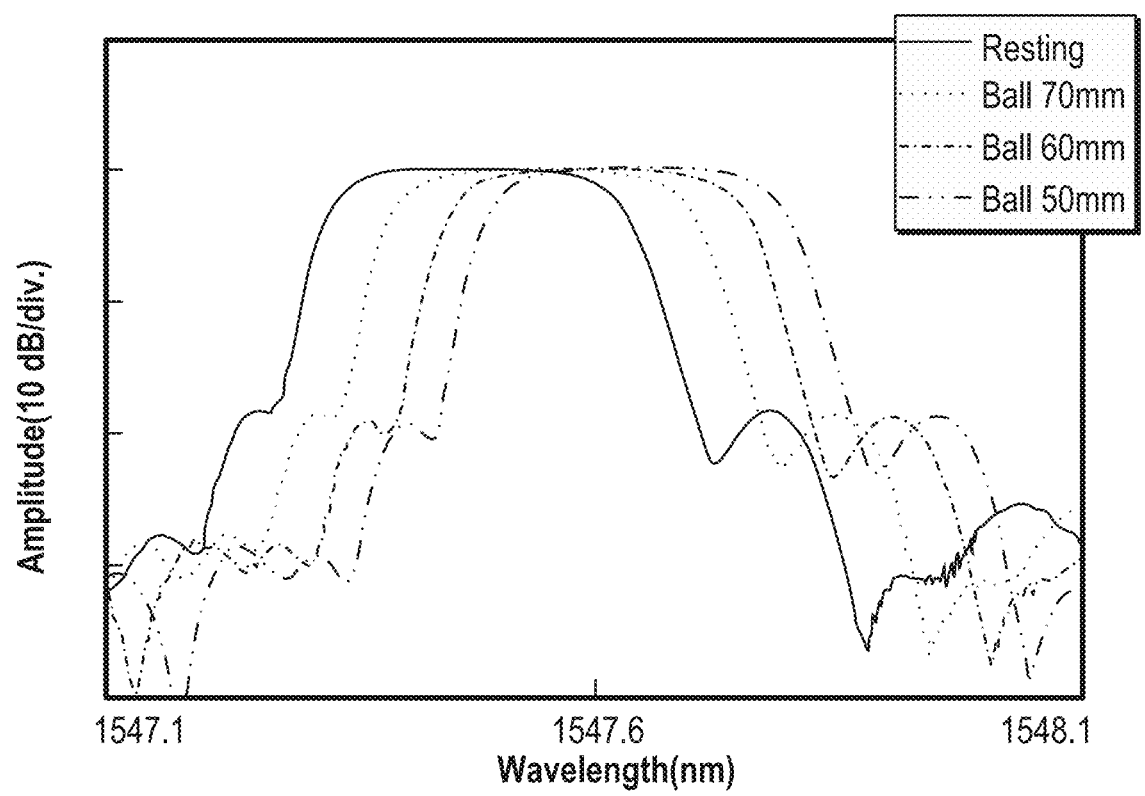
FIG. 14 is a plot illustrating the optical spectra of the FBG sensor in the soft robotic gripper in accordance with various embodiments of the present disclosure.

FIG. 13 illustrates an example of a plot of FBG reflection peak wavelength shift when the gripper 900 is performing a series of tasks. The FBG wavelength shifts to a shorter wavelength when the gripper 900 is activated but is not picking up the ball. When the gripper 900 is activated, the arms are bent inward, essentially compressing the FBG 109 and results in a decrease in reflection wavelength. When the gripper is activated and is picking up the ball, the FBG reflection wavelength is shifted to a longer wavelength. The heavier the ball, the largest wavelength shift is resulted. When the gripper 900 is picking up the ball, the ball is pressing onto the FBG sensor 106 from the inside and pushing the FBG outward, essentially stretching the FBG 109 and resulting in an increase in reflection wavelength. When the gripper 900 is deactivated, the FBG reflection wavelength goes back to the resting value. Optical spectra of the FBG 109 in Arm B are also measured when the soft robotic gripper 900 is picking up balls of diameter between 50-70 mm and weighted 28 g, as shown in FIG. 14. It is observed that the smaller the ball the larger is the wavelength shift. This is due to a sharper bending of the arms resulted from a small ball diameter. According to FIGS. 13 and 14, the demonstrated stretchable FBG embedded soft robotic gripper 900 is capable of sensing and distinguishing different status of the soft robotic gripper 900, as well as size and weight of the object. This information is essential for the gripper 900 to handle delicate and high-precision tasks.

To increase the resolution and sensitivity of the FBG sensor 106, optical power measurement can be used instead of spectral measurement. In an experiment, a DFB lasers with lasing wavelength at 1544.95 nm was used as the light source and its lasing wavelength was aligned to the shorter wavelength spectral edge of the embedded FBG optical fiber 106 in Arm A. Therefore, an increase in power is resulted if the FBG reflection spectrum is shifted to the shorter wavelength side, and a decrease in power is resulted if the wavelength is shifted to the longer wavelength side. An optical power meter with sensitivity of −45 dBm was used to measure the reflected power from the FBGs.

Figure 15:
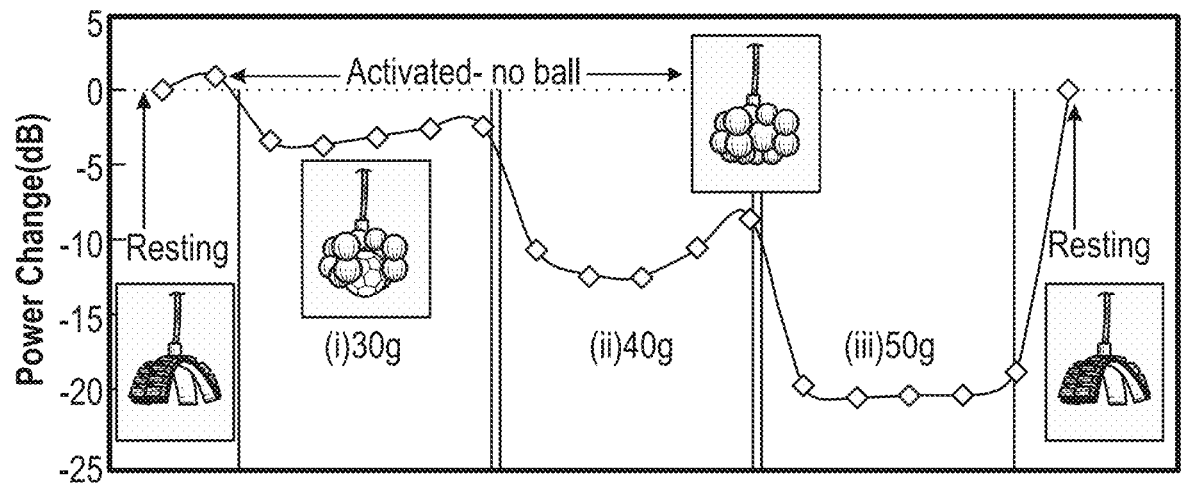
FIG. 15 is a plot illustrating the power change of the FBG sensor during a series of events in accordance with various embodiments of the present disclosure.
Figure 16:
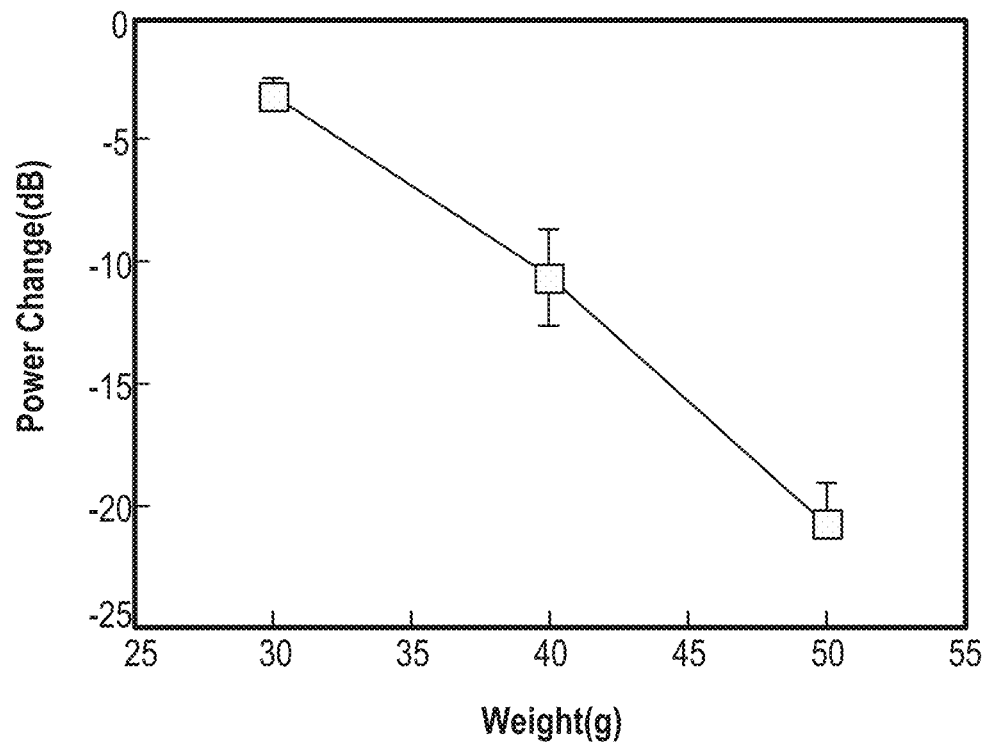
FIG. 16 is a plot illustrating the relationship between power change and the weight of an object being picked up by the robotic gripper in accordance with various embodiments of the present disclosure.

As the gripper is activated, the FBG reflection peak shifts and results in a change in reflectivity at the laser wavelength. Therefore, by measuring the resultant reflected optical power from each FBG sensor, the motions and status of the gripper can be determined. FIG. 15 illustrates an example of a plot of the power change at the laser wavelength during a series of events happen at the soft robotic gripper 900. Initially, the gripper 900 is not activated (resting) and gives a reflected power of −10.93 dBm at the laser wavelength. Then the gripper 900 is activated, but is not picking up any object, and the reflection spectrum is shifted to a shorter wavelength, resulting in a 1-dB increase in the reflected power. When the gripper 900 is in contact with a ball with weight of 30 g, the reflected optical power decreases by 3.2 dB. A 10.7 dB and 20.7 dB decrease in power is observed when the weight of the ball is increased to 40 g and 50 g, respectively. A plot of the relationship between the object weight and FBG reflected power change is shown in FIG. 16 and small error bars are observed. The capability to distinguish object with different weight is important in a soft robotic gripper—the results indicates that the soft robotic gripper can sense when there is an external pulling force at the object, i.e. the object is stuck when being lifting up by the soft robotic gripper.

The unique embedding structure of the FBG optic fiber 106 enables stretching of the sensor 106 without dislocating from the soft robotic gripper 900. Through the measurement of wavelength shift, the FBG sensors embedded soft robotic gripper 900 can sense and distinguish various status of the gripper 900, including resting, activated but failed to pick up an object, and picking up objects with different size and weight. During experiments, larger amount of wavelength shift was observed when as the weight of the ball increased or when the size of the ball decreased. The FBG wavelength shifted to the opposite direction if the gripper 900 failed to pick up the ball. Through optical power measurement, high sensitivity sensing in the soft robotic gripper 900 is achieved. A total of 20 dB of power change was observed when the weight of the object was changed from 30 g to 50 g. An opposite sign of power change was observed when the gripper failed to pick up the object. The unique sinusoidally embedding structure enabled the use of conventional fiber optic sensors 106 in soft robots, allowed the soft robot to work under harsh environment, and benefited from the unique advantages of glass fiber sensors.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A fiber optic sensor, comprising:
a deformable silicone substrate; and
an optical fiber comprising a single core, the optical fiber being embedded within and bonded to the deformable silicone substrate, the optical fiber comprising fiber Bragg gratings (FBG), and the optical fiber being embedded within the deformable silicone substrate in a sinusoidal shape, wherein the sinusoidal shape is configured to enable stretching and elongation of the fiber optic sensor by up to about thirty percent by unfolding the optical fiber in a manner that avoids its delamination from the deformable silicone substrate.

2. The fiber optic sensor of claim 1, wherein a Bragg wavelength shift corresponding to the FBG is used to determine a tension, a torsion direction, an amount of torsion, a bending curvature, or a bending direction of an object coupled to the fiber optic sensor.

3. The fiber optic sensor of claim 1, wherein the sinusoidal configuration of the optical fiber enables stretching and elongation due to torsion, and sensing of its direction.

4. The fiber optic sensor of claim 1, wherein the optical fiber is embedded in an off-centered position within the deformable silicone substrate.

5. The fiber optic sensor of claim 4, wherein the off-centered position is below or above a neutral line of the deformable silicone substrate.

6. The fiber optic sensor of claim 4, wherein a torsion direction measurement is based at least in part on at least one of the off-centered position of the optical fiber or the sinusoidal shape of the optical fiber.

7. The fiber optic sensor of claim 1, wherein the FBG is stretched when the fiber optic sensor has a positive torsion.

8. The fiber optic sensor of claim 1, wherein the FBG is compressed when the fiber optic sensor has a negative torsion.

9. The fiber optic sensor of claim 1, wherein the optical fiber comprises glass or polymer.

10. The method of claim 1, wherein the sinusoidal shape comprises at least one full sinusoidal cycle.

11. A method, comprising:
placing a fiber optic sensor on an object, the fiber optic sensor comprising a deformable silicone substrate and an optical fiber comprising a single core and fiber Bragg gratings (FBG), the optical fiber being embedded within and bonded to the deformable substrate, wherein the optical fiber is disposed in a sinusoidal shape within the deformable silicone substrate, and wherein the sinusoidal shape is configured to enable stretching and elongation of the fiber optic sensor up to about thirty percent without delamination by unfolding the optical fiber in a manner that avoids its delamination from the deformable silicone substrate; and
determining at least one object characteristic based at least in part on a Bragg wavelength associated with the FBG.

12. The method of claim 11, wherein the at least one object characteristic comprises at least one of a tension, a torsion direction, an amount of torsion, a bending curvature, or a bending direction of the object.

13. The method of claim 11, wherein the optical fiber is embedded in an off-centered position within the deformable silicone substrate.

14. The method of claim 11, wherein the deformable substrate is silicone.

15. The method of claim 11, wherein the fiber optic sensor is stretchable and can be elongated at about thirty percent.

16. The method of claim 11, further comprising measuring at least one of: an amount of a Bragg wavelength shift, a direction of the Bragg wavelength shift, or an optical power change, wherein determining the at least one object characteristic is based at least in part on at least one of the amount, the direction or the optical power change.

17. The method of claim 11, wherein the sinusoidal shape comprises at least one full sinusoidal cycle.

18. A method, comprising:
positioning a respective end of an optical fiber in respective notches on opposing sidewalls of a mold, the optical fiber having fiber Bragg gratings (FBG) being positioned around a plurality of columns in the mold to form a sinusoidal shape, the optical fiber comprising a single core;
pouring a silicone mixture into the mold;
curing the silicone mixture to form a fiber optic sensor, the fiber optic sensor being configured to determine at least one of a tension, a torsion direction, an amount of torsion, a bending curvature, or a bending direction of an object, and the optical fiber having the sinusoidal shape within the cured silicone mixture; and
removing the fiber optic sensor from the mold;

wherein the sinusoidal shape is configured to enable stretching and elongation of the fiber optic sensor up to about thirty percent without delamination by unfolding the optical fiber in a manner that avoids its delamination from the deformable silicone substrate.

19. The method of claim 18, wherein the optical fiber is positioned within an off-centered position of the mold such that the optical fiber is in an off-centered position of the silicone mixture.

20. The method of claim 18, further comprising forming the silicone mixture by mixing a first type of silicone with a second type of silicone.

* * * * *

UNITED STATES PATENT AND TRADEMARK OFFICE
CERTIFICATE OF CORRECTION

Page 1 of 1

PATENT NO. : 10,989,865 B2
APPLICATION NO. : 16/266659
DATED : April 27, 2021
INVENTOR(S) : Mable P. Fok, Xianqiao Wang and Li Xu It is certified that error appears in the above-identified patent and that said Letters Patent is hereby corrected as shown below:

On the Title Page

Item (72) Delete "Xiangiao" and replace with --Xianqiao--

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*